US006095670A

United States Patent [19]

Vosika et al.

[11] Patent Number: 6,095,670
[45] **Date of Patent: *Aug. 1, 2000**

[54] CIRCULAR MOUNTING PLATE ADAPTER FOR ATTACHING AN EXIT SIGN TO A JUNCTION BOX

[75] Inventors: David A. Vosika, Cloverdale; Drusilla L. Underwood, Dublin, both of Va.

[73] Assignee: Hubbell Incorporated, Orange, Conn.

[ * ] Notice: This patent is subject to a terminal disclaimer.

[21] Appl. No.: 09/124,781

[22] Filed: Jul. 30, 1998

[51] Int. Cl.[7] .......... B60Q 1/00

[52] U.S. Cl. .......... 362/368; 362/812; 40/570; 439/536

[58] Field of Search .......... 362/147, 226, 362/368, 812; 40/541, 564, 570; 248/906; 439/535, 536

[56] References Cited

U.S. PATENT DOCUMENTS

| | | | |
|---|---|---|---|
| 4,201,005 | 5/1980 | Hunt | 40/570 |
| 4,263,739 | 4/1981 | Lee | 40/606 |
| 4,813,197 | 3/1989 | Teisen-Simony | 52/785 |
| 5,018,290 | 5/1991 | Kozek et al. | 40/570 |
| 5,272,605 | 12/1993 | Johnstone | 362/147 |
| 5,349,513 | 9/1994 | Taylor, III | 362/404 |
| 5,376,020 | 12/1994 | Jones | 439/537 |
| 5,416,679 | 5/1995 | Ruskouski et al. | 362/240 |
| 5,461,550 | 10/1995 | Johnstone | 362/147 |

*Primary Examiner*—Cassandra Spyrou
*Assistant Examiner*—Mark A. Robinson
*Attorney, Agent, or Firm*—Jerry M. Presson; Leopold Presser

[57] ABSTRACT

A structure for mounting an exit sign to a standard wall-mounted electrical junction box. The structure is constituted of a separate plate which is adapted to be fastened to the back cover of an exit sign so as to form a mounting structure adapted for facilitating the attachment of the exit sign to a wall-mounted electrical junction box.

11 Claims, 5 Drawing Sheets

CIRCULAR MOUNTING PLATE ADAPTER FOR ATTACHING AN EXIT SIGN TO A JUNCTION BOX

BACKGROUND OF THE INVENTION

1. Field of the Invention

The present invention relates to a structure for mounting an exit sign to a standard wall-mounted electrical junction box. More particularly, the invention pertains to a structure constituted of a separate mounting plate which is adapted to be fastened to the back wall of an exit sign back cover so as to form a mounting structure adapted for facilitating the attachment of the exit sign to a wall-mounted electrical junction box.

The utilization of exit signs which may consist of essentially rectangular box-like structures having housings with exit legends illuminated by lighting fixtures arranged in canopies interiorly of the exit sign is well known and widely employed in the particular technology. In accordance with specific demands, exit signs may be mounted on walls, wherein the rear surface or back wall of the exit sign back cover is adapted to be located in surface contact with the wall and fastened to a wall-mounted junction box, ordinarily through the intermediary of screws or other suitable fastening devices, and with electrical wires or conduits extending from the junction box to the illuminating elements which are arranged within an exit sign canopy. Alternatively, the exit sign may also be side mounted or top mounted and; for example, suspended from a ceiling or extending outwardly at a generally angular orientation from a wall; for instance, such as at a right angle thereto.

Ordinarily, the back wall of the back cover of an exit sign housing when adapted to be essentially flush-mounted to a standard wall-mounted electrical junction box necessitates that a customer must push or punch out so-called “knockouts” formed in the back cover by means of suitable weakening lines, and which initially cover one or more potential holes which must align with mounting holes formed in the electrical junction box to facilitate the passage therethrough of fastening elements. This particular type of assembling procedure for the components is extremely time-consuming, and is at times difficult to implement even by experienced electricians or sign installers. Furthermore, in some instances, complicated mounting structure must be attached to an exit sign housing or the like, in which a exit sign canopy bracket structure is designed to be attached to an electrical junction box mounting plate and thereafter affixed thereto through the intermediary of suitable fastener devices.

The foregoing types of exit sign structures and arrangements for mounting such exit signs to junction boxes, particularly when mounting the exit sign to a standard wall-mounted electrical junction box in which the back cover of the exit sign is adapted to be essentially flush with or closely extend against the wall surface having the junction box mounted therein, is either difficult to install, or requires structural components which may be complex and expensive to manufacture.

2. Discussion of the Prior Art

Johnstone, U.S. Pat. No. 5,272,605 discloses an exit sign incorporating a device comprising a canopy mounting bracket wherein, particularly for top mounting of the exit sign, the canopy bracket is temporarily fastened to an electric box mounting plate for a wall-mounted or ceiling mounted electrical junction box. Resilient or spring capture barb members on the canopy mounting bracket are engaged with the mounting plate for a junction box in order to provide at least the temporary fastening prior to the exit sign being permanently attached to the junction box. This type of structure can also be applied to side-mounted exit signs; however, it is difficult to install and is not readily adapted for mounting an exit sign flush against a wall having a wall-mounted standard junction box arranged therein.

Teisen-Simony, U.S. Pat. No. 4,813,197 discloses a plate mounting system, such as for sign posting arrangements, wherein the plate elements interengage by means of suitable fastener or connecting elements. There is no disclosure of being able to mount an exit sign to a standard wall-mounted electrical junction box through the intermediary of a detachably mounted back plate fastened to the back cover of the exit sign.

SUMMARY OF THE INVENTION

Accordingly, in order to improve upon the concepts and aspects of mounting an exit sign on a wall, particularly to facilitate alignment thereof with a standard wall-mounted electrical junction box, pursuant to the present invention a back cover for the exit sign housing includes a large circular aperture having a rim-like surface portion extending thereabout which includes clip-type latching elements arranged diagonally opposite each other adjacent the edge of the circular aperture. In order to provide for the simple attachment of the back cover of the exit sign housing to the wall-mounted electrical junction box, there is provided a round junction box mounting plate which includes radially outwardly extending annular flange portions each equipped with snap-like latching elements adapted to engage in openings formed in the clip-type elements on the back cover response to being rotated through a small rotational angle, whereby the junction mounting plate will be fixedly engaged on the back cover.

The junction box mounting plate may possess a central opening for passage thereto of electrical wiring extending from the electrical junction box which is mounted in the wall, and is provided with junction box mounting holes dispersed about the perimeter of the mounting plate which are adapted to be in alignment with mounting holes in the electrical junction box such that screws or similar fasteners can extend therethrough for attaching the junction mounting plate and the back cover of the exit sign which is fastened thereto to the electrical junction box.

As indicated, the junction box mounting plate which is adapted to be fastened in position over the aperture formed in the wall of the back cover for the exit housing has the mounting holes for electrical junction box preformed therein, so as to obviate the necessity for punching out of any knockouts, and enabling for ready alignment with attachment holes of the electrical junction box which is mounted in the wall.

Suitable canopy mounting and attaching structure may be provided on the junction box mounting plate for attachment thereto of a canopy when the exit sign is mounted on a wall-mounted electrical junction box. The structure and functioning of the canopy mounting and fastening structure is described in applicants' copending application Ser. No. 09/124,774 (Attorney Docket 740-134 US; 11059), the disclosure of which is incorporated herein by reference.

When it is desired to have the exit sign either side mounted or top mounted; in essence, when no electrical junction box mounted in a wall is adapted to have the sign mounted in a flush relationship thereon, but rather in which the exit sign is adapted to extend outwardly from a wall or ceiling, instead of attaching a junction box mounting plate to the back cover, there is provided a similarly shaped but essentially blank plate which does not possess any openings for the passage therethrough of electrical wiring, junction box mounting holes or canopy mounting structure. In this instance, the cooperating clip-like latching elements on the back cover and the snap-like latching elements on the blank plate will merely fastened the blank plate to the back cover so as to form a closure for the aperture in the back cover.

Accordingly, it is an object of the present invention to provide a novel mounting plate arrangement for attaching the back cover of an exit sign to a standard wall-mounted electrical junction box.

Another object of the invention resides in the provision of a junction box mounting plate which is adapted to be mounted so as to extend over a large central aperture formed in the wall of a back cover for an exit sign housing, and wherein interengageable latching elements fasten the junction box mounting plate to the back cover so as to lock these components to each other.

A more specific object of the invention resides in the provision of a junction box mounting plate of the type described which is adapted to be fastened to an exit sign back cover to extend over a large central aperture formed in the wall of the back cover, and wherein the junction box mounting plate has preformed holes formed therein which will facilitate the attachment of the mounting plate in conjunction with the back cover to a standard wall-mounted electrical junction box.

A further object of the present invention resides in the provision of a blank plate adapted to be latchingly fastened to the back cover of the exit sign in lieu of a junction box mounting plate so as to extend over the aperture in the back cover when it is intended to either side mount or top mount the exit sign.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF A PREFERRED EMBODIMENT

Figure 1:
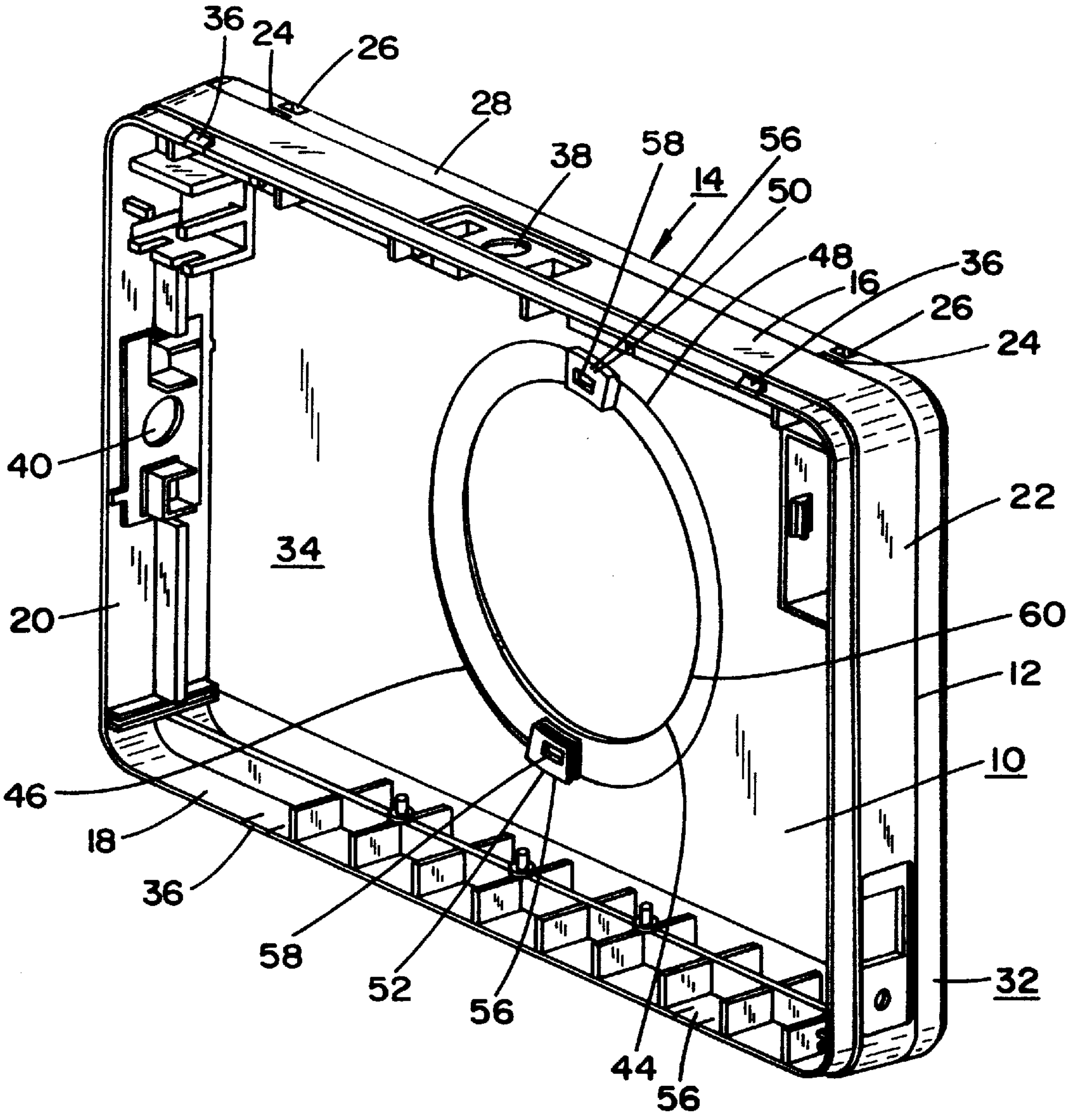
FIG. 1 illustrates a perspective front and side view of the back cover and housing frame of an exit sign in accordance with the present pursuant to the invention.
Figure 2:
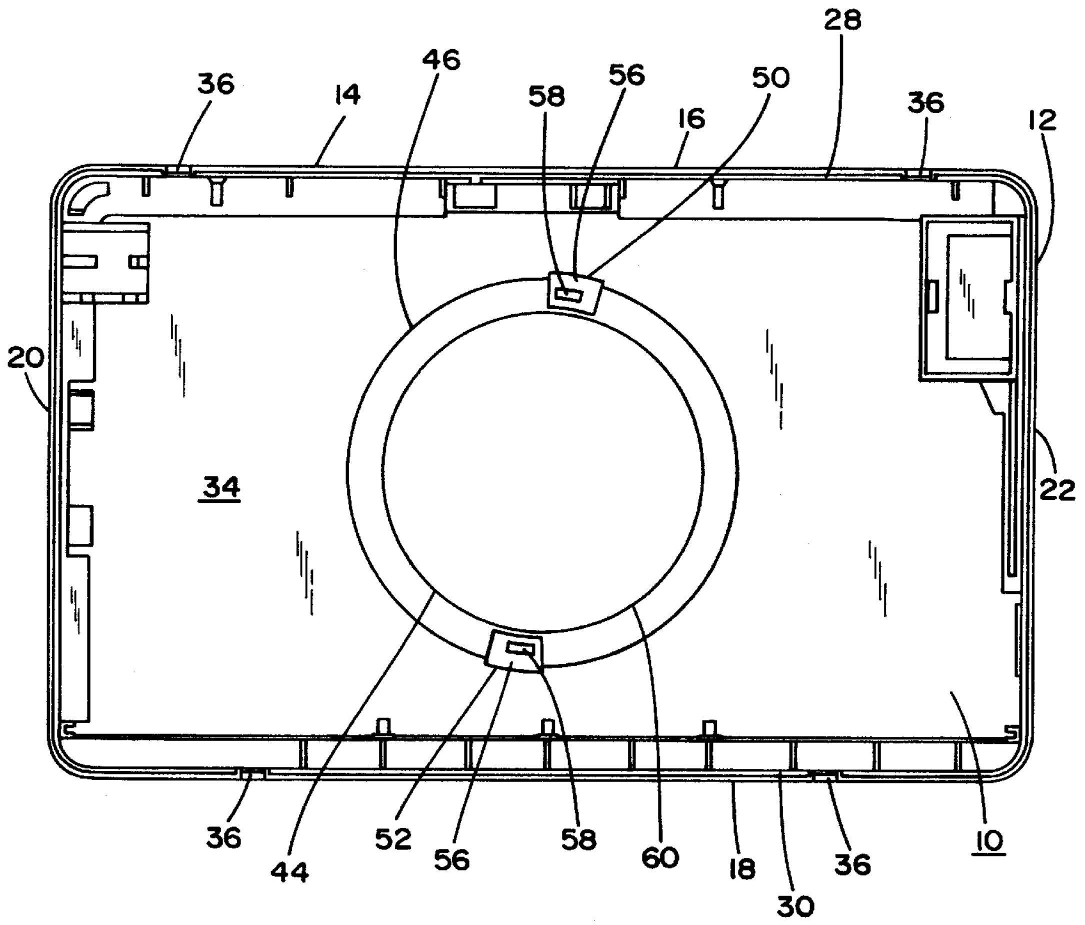
FIG. 2 illustrates a front view of the back cover and housing frame of FIG. 1.
Figure 3:
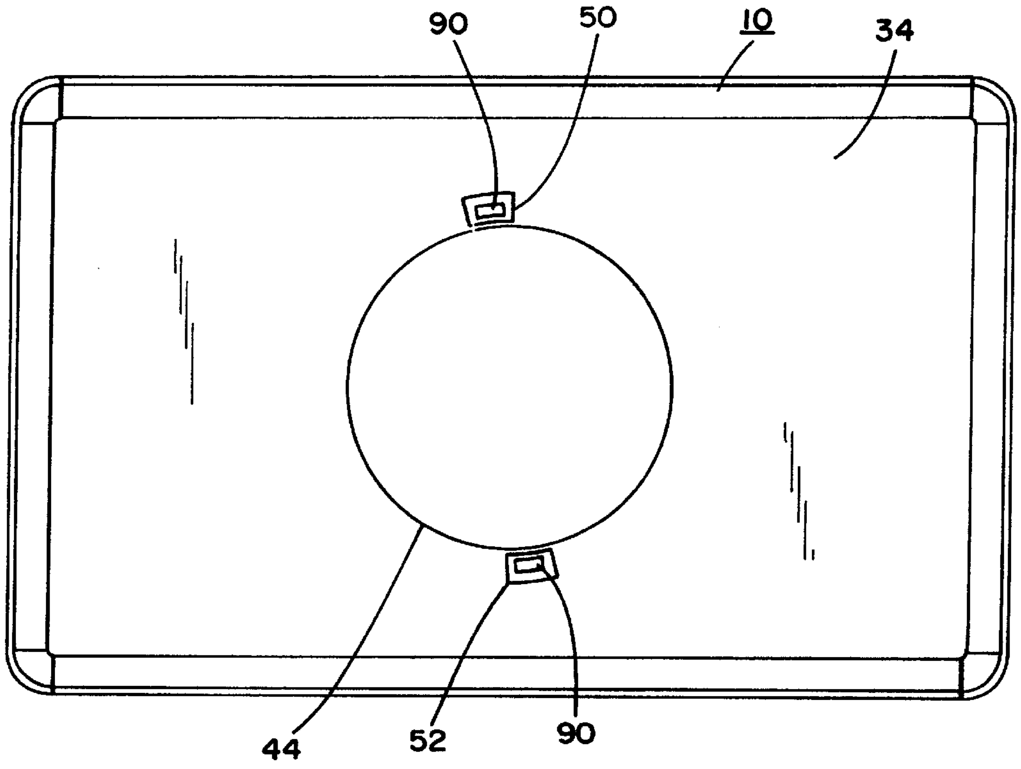
FIG. 3 illustrates a rear view of the back cover and housing frame of the exit sign of FIG. 1.

Referring now in particular to FIGS. 1 to 3, there is disclosed the back cover 10 and housing frame 12 of an exit sign 14. The housing frame is of an essentially rectangular peripheral configuration having upper and lower walls 16 and 18, and side walls 20 and 22 so as to form an encompassing exit sign frame structure, as is well known in the art. The housing frame 12 includes latching elements 24 adapted to engage complementary latching elements 26 on the upper and lower flange structures 28, 30 forming parts of the peripheral ledge 32 of the back cover 10. The back wall 34 of the back cover 10 is of an essentially flat or planar configuration.

The housing frame 12 may also be provided with suitable latching structures 36 at the forward edges of the upper and lower walls 16, 18 for latching engagement with a front cover (not shown) of the exit sign 14. Furthermore, suitable apertures 38 may be formed in the upper housing wall 16 and apertures 40 in the one housing side wall 20 which, as may be required, will enable the exit sign 14 to be, respectively, either top-mounted or side-mounted; in essence, mounted either suspended from a ceiling or extending outwardly from a wall surface. This type of exit sign mounting is known in the technology, having reference to the above-mentioned U.S. Pat. No. 5,272,605.

In the present instance, in order to facilitate the mounting of the back cover 10 on a standard wall-mounted electrical junction box (not shown) which is normally mounted flush with or recessed within a wall, rather than providing so-called "knockouts" which have been heretofore incorporated in the back covers, and which must be punched or pushed out to form openings in alignment with mounting arrangements in the junction box, which is difficult to implement, pursuant to the invention, the back wall 34 of the back cover 10 is provided with a large centrally located round aperture 44. Extending about the aperture 44 is an annular recessed surface portion 46 in the interior surface 48 of the back wall 34, and mounting latching elements 50, 52 for the attachment of a junction box mounting plate 54, as described in detail hereinbelow.

The latching elements 50, 52 are arranged diametrically opposite each other on the surface of the annular recessed surface portion 46 adjacent the circumference of the round aperture 44. Each latching element comprises an essentially C-shaped clip with the open end of each clip facing along the circumference, and in which the outer leg portion 56 of each latching element clip including a through-opening 58 for engaging a complementary latching element on the junction box mounting plate 54.

Figure 4:
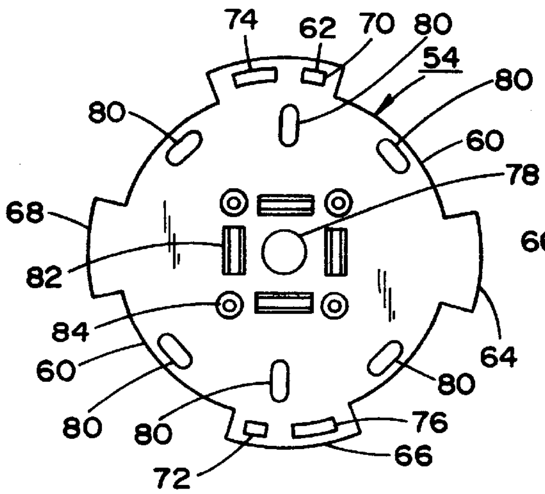
FIG. 4 illustrates a front view of a junction box mounting plate pursuant to the invention which is adapted to be mounted on the back cover of the exit sign.
Figure 6:
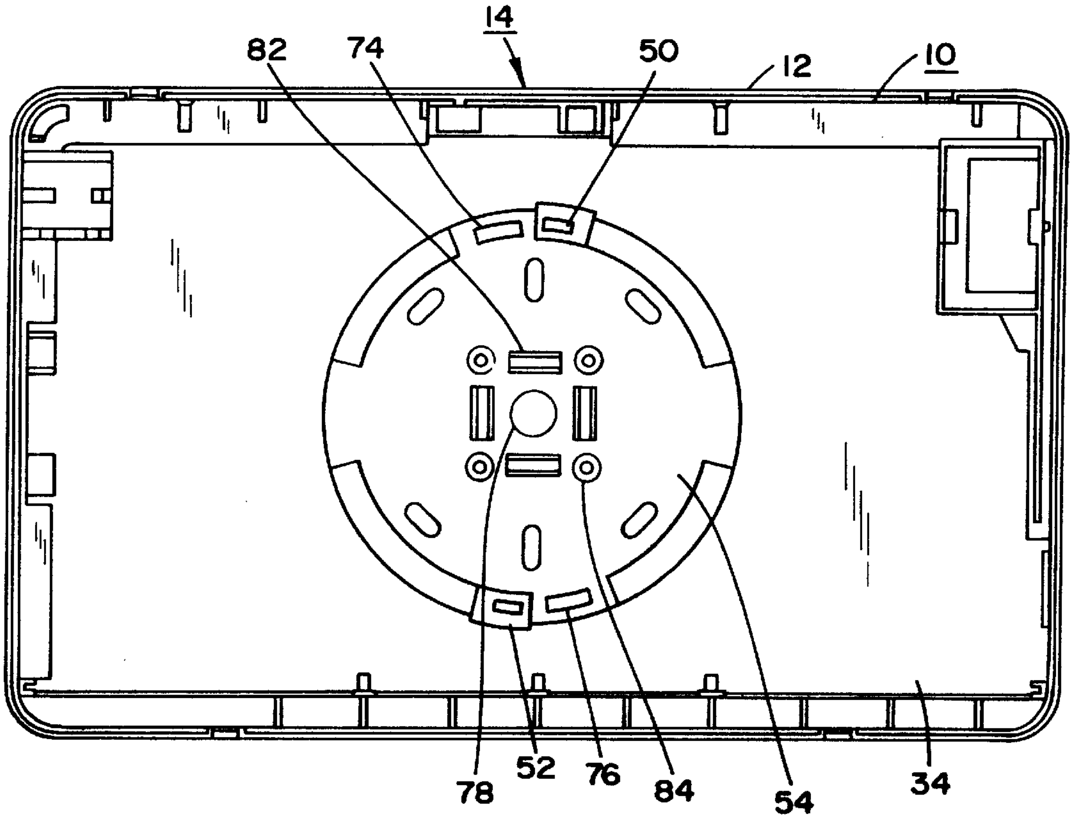
FIG. 6 illustrates a front view of the back cover of the exit sign, shown with the junction box mounting plate of FIG. 4 being mounted thereon.
Figure 7:
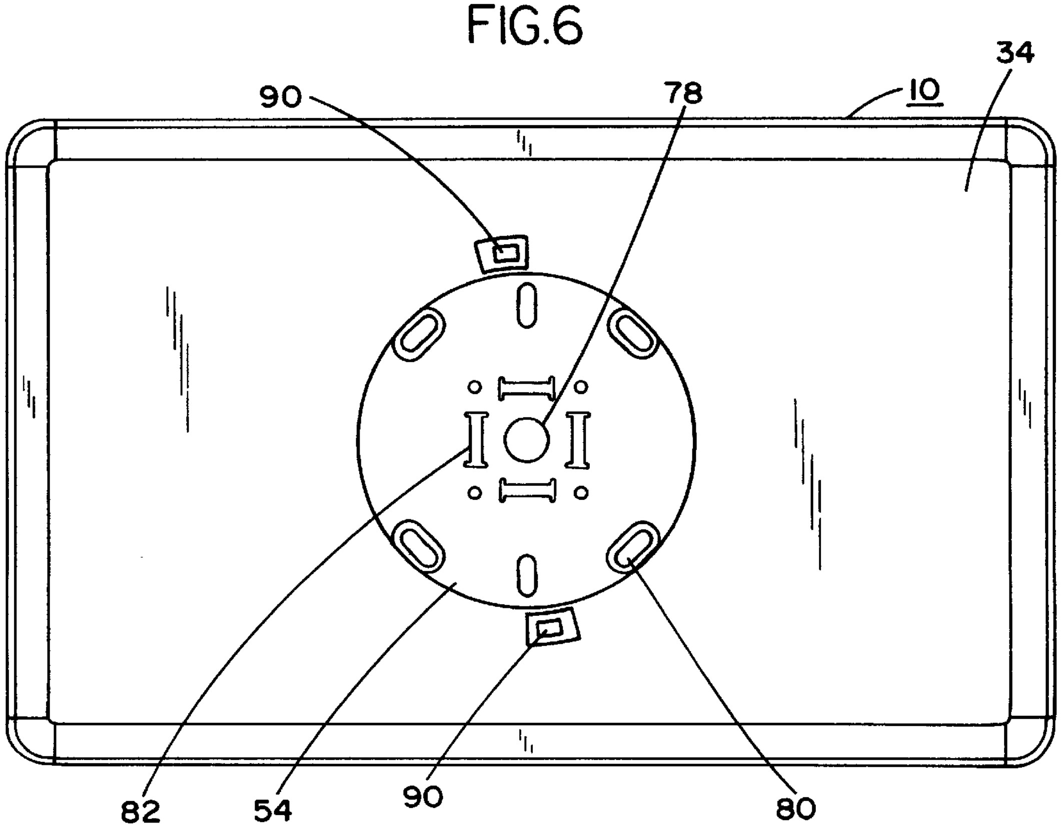
FIG. 7 illustrates a rear view of the arrangement of FIG. 6.
Figure 8:
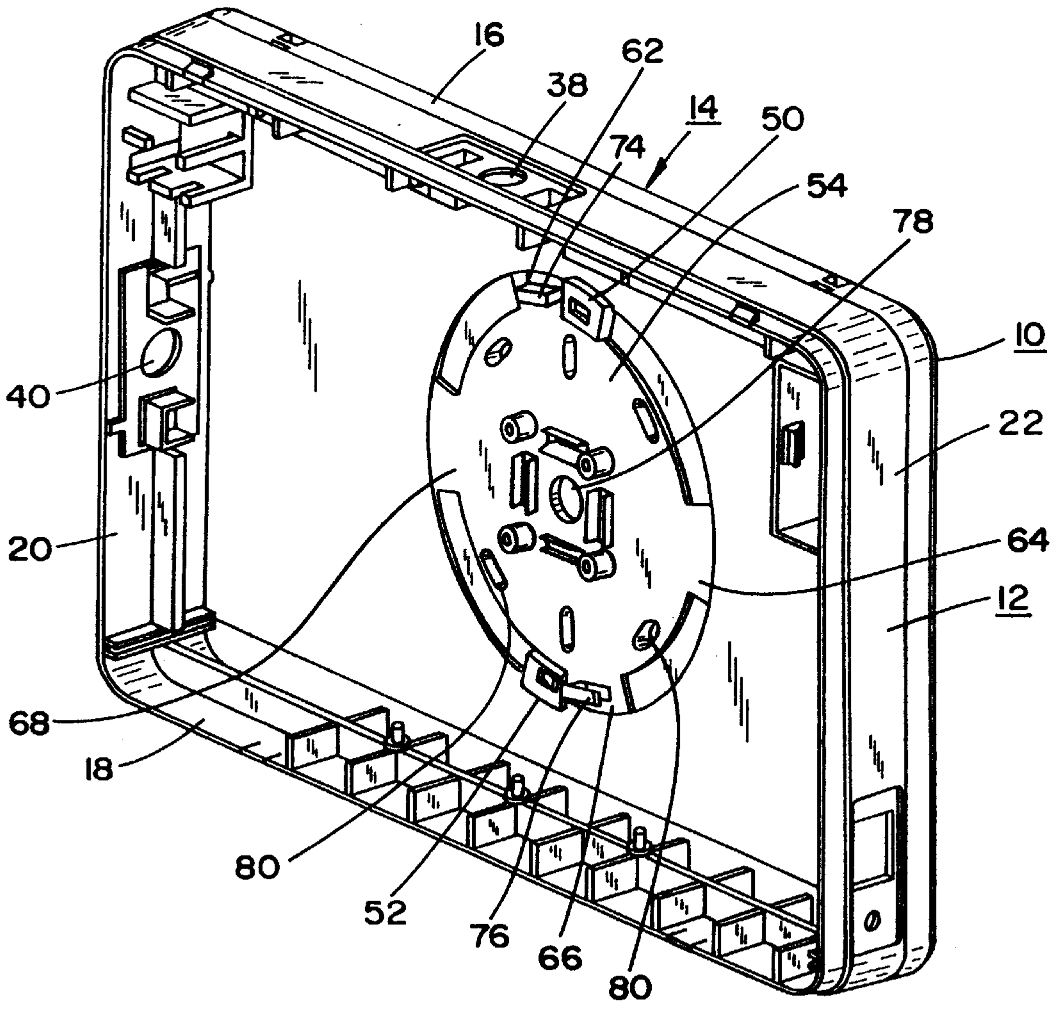
FIG. 8 illustrates a perspective view of the back cover and housing frame for the exit sign as in FIG. 1, shown with the junction box mounting plate of FIG. 4 being positioned thereon and fastened thereto.

When it is intended to mount the exit sign 14 with its back cover 10 flush against or close to a wall, in which the back cover 10 is to be fastened to a standard wall-mounted electrical junction box (not shown), the junction box mounting plate 54, as shown in FIG. 4 of the drawings, is adapted to be fastened to the back cover so as to extend the aperture in the back wall 34 of the back cover 10, as shown in FIGS. 6 through 8 of the drawings.

As illustrated, the outer diameter 60 of the essentially round and flat junction box mounting plate 54 is substantially equal to the diameter of the aperture 44 in the center of the back cover 10, and wherein four (or more) coplanar arcuate tab portions 62, 64, 66 and 68 extend radially outwardly therefrom, each of which subtends a short angular extent and is of a radial width substantially equal to the radial width of the annular recessed surface portion 46 mounting the latching elements 50, 52.

As shown in particular in drawing FIG. 4, two diametrically oppositely located of the tabs 62, 66, which each possess a radial width corresponding essentially to the radial width of the recessed annular surface portion 46 in the back cover 10, each include resilient snap elements 70, 72 extending upwardly therefrom, which when the mounting plate 54 is positioned on the recessed surface portion 46 and rotated within its plane, the snap elements come into latching engagement with the openings 58 in the respective therewith associated clip elements 50, 52 formed on the back cover 10, so as to lock the junction box mounting plate 54 into fixed engagement with the back cover 10 superimposed on aperture 44.

Proximate the snap elements 70, 72 on the radially outward extending tabs 62, 66 of the junction box mounting plate 54 are electrical wire retainer clips 74, 76 which are adapted to engage electrical wires which may be passed through a suitable center hole 78 formed in the junction box mounting plate 54.

Inventively, the junction box mounting plate 54 is provided with a plurality of junction box mounting holes 80, which may each be of an elongate or slotted configuration, and which are suitably spaced about the circumference of the junction box mounting plate 54 so as to allow for the insertion therethrough of suitable fastener elements (not shown) for attaching the plate to an electrical wall-mounted junction box (not shown).

The center region of the junction box mounting plate 54 may also be provided with a plurality of slot structures 82 and bosses 84 arranged about the center hole 78 for the mounting of an exit sign canopy, as is described in detail in the copending patent application Ser. No. 09/124,774 of the present applicants.

The foregoing arrangement facilitates the easy mounting of the junction box mounting plate 54 of FIG. 4 on the recessed surface portion of the back cover 10 of the exit sign 14 as shown in FIGS. 6 to 8 of the drawings, and eliminates the need for providing knockouts in the back wall of the back cover 10. When it desired to remove the mounting plate 54 from the back cover, pressure may be applied through openings 90 as shown in FIG. 7, so as to disengage the latching elements, and to then rotate the mounting plate 54 opposite to the previous direction of rotation.

Once the exit sign 14 is mounted to the electrical junction box, the latching elements 50, 52 facilitate the back plate being locked into place on the back cover. This prevents the exit sign from being intentionally or accidentally disengaged from the back plate and thus from the electrical junction box. The fasteners through which the junction box mounting plate 54 is mechanically attached to the electrical junction box must first be removed in order to remove the exit sign from the wall.

Figure 5:
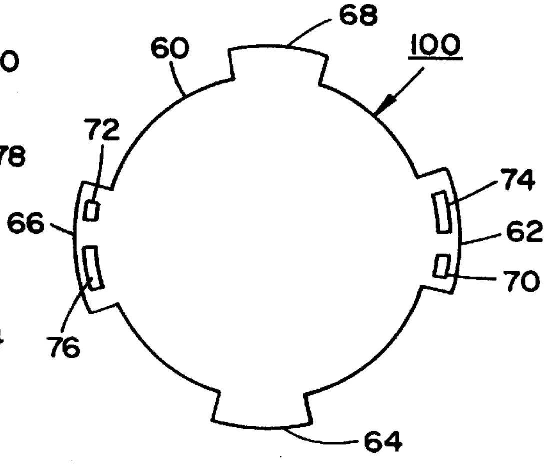
FIG. 5 illustrates a blank mounting plate adapted to be mounted on the back cover instead of the junction box mounting plate of FIG. 4.

In order to mount the exit sign 14 in a side-mounted or top-mounted mode, in which the aperture in the back cover is to be closed in the absence of a junction box behind the back cover 10, instead of the junction box mounting plate 54 of FIG. 4, there is provided a blank mounting plate 100 as shown in FIG. 5. This blank plate has essentially the same overall dimensions and latching elements 70, 72 as does the junction box mounting plate 54; in which elements similar to those in plate 54 are identified by the same reference numerals. The blank plate 100 eliminates all of the previous elements, such as the junction box mounting holes, and any slot arrangements or mounting arrangements for a canopy and the like.

When it is intended to mount the exit sign 14 as a side-mounted or top-mounted unit, the junction box mounting plate 54 with the apertures shown in FIG. 4 may be arranged in conjunction with a canopy for mounting the exit sign to a junction box, whereas the blank mounting plate 100 is positioned in the back cover 10 of the exit sign 14.

Pursuant to another aspect, when it is adapted to provide a double-sided exit sign 14; in effect, viewable from both sides thereof when either side or top-mounted, in that instance, only the junction box mounting plate 54 with the mounting holes as shown in FIG. 4 is employed in conjunction with the canopy. The blank mounting plate 100 as illustrated in FIG. 5 may then be readily discarded by a customer.

From the foregoing, it becomes readily apparent that the invention is directed to a simple and inexpensive construction for mounting an exit sign to a junction box through the intermediary of the inventive junction box mounting plate 54 which may be utilized either mounted on the back cover 10 of the exit sign 14, or optionally replaced by a blank mounting plate 100, or in which the junction box mounting plate 54 may be utilized for any intended side or top mounting of the exit sign.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A mounting arrangement for fastening an electrical fixture having a housing and a planar back cover for said housing to an electrical junction box which is located in a wall, said back cover having a centrally located aperture, and latching means arranged about the perimeter of said aperture; said mounting arrangement comprising:

a plate member positionable over said aperture, latching elements on said plate member for engaging said latching means so as to fasten said plate member to the back cover, said plate member including a center opening for the passage therethrough of electrical wiring extending from the electrical junction box; and a plurality of holes extending through said plate member at predetermined locations to facilitate insertion therethrough of fasteners for mounting said plate member to said electrical junction box whereby the back cover is positioned in closely spaced relationship with said electrical junction box, said aperture in said back cover being circular, a recessed annular surface portion within said back cover extending about said aperture, and said latching means comprising resilient clip elements extending from said recessed annular surface portion and being located diametrically opposite each other.

2. A mounting arrangement as claimed in claim 1, wherein said plate member comprises a circular plate having a diameter substantially the size of the diameter of said aperture, and including a plurality of radially outwardly extending coplanar flange portions spaced about the circumference of said plate member so as to be positioned in surface contact with said recessed annular surface portion in the back cover.

3. A mounting arrangement as claimed in claim 2, wherein said latching elements on said plate member comprising diametrically oppositely located resilient snap elements adapted to latchingly engage into said clip elements for securing and locking said plate member to the inner surface of said back cover.

4. A mounting arrangement as claimed in claim 3, wherein said clip elements include openings for latchingly receiving said resilient snap elements on said plate member.

5. A mounting arrangement as claimed in claim 2, wherein said latching elements on said plate member are located on at least some of the flange portions of said plate member.

6. A mounting arrangement as claimed in claim 1, wherein said latching means on said back cover and the latching elements on said plate member are releasably engageable for the detaching of said plate member from said electrical fixture.

7. A mounting arrangement as claimed in claim 1, wherein said plate member comprises means for mounting an illumination canopy in said electrical fixture.

8. A mounting arrangement as claimed in claim 1, wherein said plate member comprises a blank mounting plate without holes therein for closing the aperture in said back cover, said blank mounting plate being a replacement for said electrical junction box mounting plate member when the electrical fixture is intended to be side-mounted or top-mounted.

9. A mounting arrangement as claimed in claim 1, wherein said electrical fixture comprises an exit sign.

10. A mounting arrangement as claimed in claim 1, wherein said housing is rectangular in shape, said back cover having a planar back wall and said aperture being formed in the center of said back wall.

11. A mounting arrangement as claimed in claim 1, wherein said plurality of holes in said plate member each comprises an elongate slotted hole to facilitate alignment thereof with fastening structure in a wall-mounted electrical junction box.

* * * * *